(12) United States Patent
Deak et al.

(10) Patent No.: US 6,706,076 B2
(45) Date of Patent: *Mar. 16, 2004

(54) PROCESS FOR SEPARATING LIPOPHILIC FLUID CONTAINING EMULSIONS WITH ELECTRIC COALESCENCE

(75) Inventors: John Christopher Deak, West Chester, OH (US); Paul Amaat France, West Chester, OH (US); Anna Vadimovna Noyes, Hamilton, OH (US); Arseni V. Radomyselski, Hamilton, OH (US)

(73) Assignee: Procter & Gamble Company, Cincinnati, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/849,556

(22) Filed: May 4, 2001

(65) Prior Publication Data

US 2002/0038480 A1 Apr. 4, 2002

Related U.S. Application Data

(60) Provisional application No. 60/209,468, filed on Jun. 5, 2000, provisional application No. 60/209,444, filed on Jun. 5, 2000, provisional application No. 60/209,443, filed on Jun. 5, 2000, provisional application No. 60/209,250, filed on Jun. 5, 2000, and provisional application No. 60/241,174, filed on Oct. 17, 2000.

(51) Int. Cl.[7] ............................. D06F 0/00; D06M 11/00
(52) U.S. Cl. .................. 8/137; 8/142; 8/147; 8/115.51; 8/155
(58) Field of Search ........................... 8/137, 142, 147, 8/115.51, 158

(56) References Cited

U.S. PATENT DOCUMENTS

| | | | |
|---|---|---|---|
| 4,097,397 A | 6/1978 | Mizutani et al. | |
| 4,102,824 A | 7/1978 | Mizutani et al. | |
| 4,108,599 A | 8/1978 | Coll-Palagos et al. | |
| 4,267,077 A | 5/1981 | Niimi et al. | |
| 4,415,426 A | * 11/1983 | Hsu et al. ................ 204/290 |
| 4,708,807 A | 11/1987 | Kemerer | |
| 4,909,962 A | 3/1990 | Clark | |
| 5,037,485 A | 8/1991 | Chromecek et al. | |
| 5,116,426 A | 5/1992 | Asano et al. | |
| 5,271,775 A | 12/1993 | Asano et al. | |
| 5,302,313 A | 4/1994 | Asano et al. | |
| 5,360,571 A | 11/1994 | Kilgour et al. | |
| 5,435,920 A | * 7/1995 | Penth ...................... 210/780 |
| 5,443,747 A | 8/1995 | Inada et al. | |
| 5,503,681 A | 4/1996 | Inada et al. | |
| 5,503,778 A | 4/1996 | Liu et al. | |
| 5,520,827 A | 5/1996 | Danner | |
| 5,593,507 A | 1/1997 | Inada et al. | |
| 5,597,792 A | 1/1997 | Klier et al. | |
| 5,628,883 A | 5/1997 | Sugiyama et al. | |
| 5,676,705 A | 10/1997 | Jureller et al. | |
| 5,683,473 A | 11/1997 | Jureller et al. | |
| 5,683,977 A | 11/1997 | Jureller et al. | |
| 5,690,750 A | 11/1997 | Inada et al. | |
| 5,705,562 A | 1/1998 | Hill | |
| 5,707,613 A | 1/1998 | Hill | |
| 5,716,456 A | 2/1998 | Inada et al. | |
| 5,722,781 A | 3/1998 | Yamaguchi | |
| 5,741,365 A | 4/1998 | Inada et al. | |
| 5,769,962 A | 6/1998 | Inada et al. | |
| 5,783,092 A | 7/1998 | Brown et al. | |
| 5,811,383 A | 9/1998 | Klier et al. | |
| 5,858,022 A | 1/1999 | Romack et al. | |
| 5,865,852 A | 2/1999 | Berndt | |
| 5,866,005 A | 2/1999 | DeSimone et al. | |
| 5,876,510 A | 3/1999 | Kuemin et al. | |
| 5,877,133 A | 3/1999 | Good | |
| 5,888,250 A | 3/1999 | Hayday et al. | |
| 5,929,012 A | 7/1999 | Del Duca et al. | |
| 5,942,007 A | 8/1999 | Berndt et al. | |
| 5,944,996 A | 8/1999 | DeSimone et al. | |
| 5,954,869 A | 9/1999 | Elfersy et al. | |
| 5,977,040 A | 11/1999 | Inada et al. | |
| 5,977,045 A | 11/1999 | Murphy | |
| 5,985,810 A | 11/1999 | Inada et al. | |
| 6,042,617 A | 3/2000 | Berndt | |
| 6,042,618 A | 3/2000 | Berndt et al. | |
| 6,056,789 A | 5/2000 | Berndt et al. | |

(List continued on next page.)

FOREIGN PATENT DOCUMENTS

| | | |
|---|---|---|
| CA | 1 239 326 | 7/1988 |
| DE | 37 39711 A1 | 8/1989 |
| EP | 0 479 146 B1 | 12/1996 |
| EP | 0841 362 A2 | 5/1998 |
| EP | 1 041 189 A1 | 10/2000 |
| EP | 1 092 803 A1 | 4/2001 |
| JP | 1097-798 A | 5/1986 |
| JP | 3046-300 A | 2/1988 |
| JP | 3063-799 A | 3/1988 |
| JP | 1188-595 A | 7/1989 |

(List continued on next page.)

OTHER PUBLICATIONS

US 6,001,133, 12/1999, DeYoung et al. (withdrawn)

Trilo et al.; "Critical Micelle Density for the Self–Assembly of Block Copolymer Surfactants in Supercritical Carbon Dioxide"; pp. 416–421.

Sarbu et al.; "Non–Fluorous Polymers with Very High Solubility in Supercritical $CO_2$ Down to Low Pressures"; pp. 165–168.

Primary Examiner—Yogendra N. Gupta
Assistant Examiner—Derrick G Hamlin
(74) Attorney, Agent, or Firm—Caroline Wei-Berk; C. Brant Cook; Kim W. Zerby

(57) ABSTRACT

The present invention relates to a method for electrically coalescing emulsions especially those containing lipophilic fluid. The present invention is also directed to a method to treat fabrics wherein such an emulsion is created during the treatment process and requires electric coalescence prior to reuse of the lipophilic fluid.

13 Claims, No Drawings

U.S. PATENT DOCUMENTS

| | | | |
|---|---|---|---|
| 6,059,845 | A | 5/2000 | Berndt et al. |
| 6,060,546 | A | 5/2000 | Powell et al. |
| 6,063,135 | A | 5/2000 | Berndt et al. |
| 6,086,635 | A | 7/2000 | Berndt et al. |
| 6,114,295 | A | 9/2000 | Murphy |
| 6,131,421 | A | 10/2000 | Jureller et al. |
| 6,136,766 | A | 10/2000 | Inada et al. |
| 6,148,644 | A | 11/2000 | Jureller et al. |
| 6,156,074 | A | 12/2000 | Hayday et al. |
| 6,177,399 | B1 | 1/2001 | Mei et al. |
| 6,200,352 | B1 | 3/2001 | Romack et al. |
| 6,200,393 | B1 | 3/2001 | Romack et al. |
| 6,200,943 | B1 | 3/2001 | Romack et al. |
| 6,204,233 | B1 | 3/2001 | Smith et al. |
| 6,228,826 | B1 | 5/2001 | De Young et al. |
| 6,242,408 | B1 | 6/2001 | Elms et al. |

FOREIGN PATENT DOCUMENTS

| | | | |
|---|---|---|---|
| JP | 2166-198 | A | 6/1990 |
| JP | 2202-599 | A | 8/1990 |
| JP | 2222-496 | A | 9/1990 |
| JP | 04323299 | A | 11/1992 |
| JP | 05051598 | A | 3/1993 |
| JP | 05239766 | A | 9/1993 |
| JP | 09143497 | A | 6/1994 |
| JP | 08073837 | A | 3/1996 |
| JP | 10-017891 | | 1/1998 |
| JP | 11-092784 | | 4/1999 |
| JP | 11-323381 | | 11/1999 |
| JP | 11-323383 | | 11/1999 |
| JP | 00144175 | A | 5/2000 |
| JP | 2000-192085 | | 7/2000 |
| JP | 00290689 | A | 10/2000 |
| WO | WO 99/57358 | | 11/1999 |
| WO | WO 00/04221 | | 1/2000 |
| WO | WO 00/04222 | | 1/2000 |
| WO | WO 00/63340 | | 10/2000 |
| WO | WO 01/06051 | A1 | 1/2001 |
| WO | WO 01/34613 | A1 | 5/2001 |
| WO | WO 01/34706 | A1 | 5/2001 |
| WO | WO 01/40567 | A1 | 6/2001 |

\* cited by examiner

PROCESS FOR SEPARATING LIPOPHILIC FLUID CONTAINING EMULSIONS WITH ELECTRIC COALESCENCE

RELATED APPLICATIONS

This application claims priority under 35 U.S.C. 119(e) to U.S. Provisional Application Serial Nos. 60/209,468, 60/209,250, 60/209,443 and 60/209,444 all of which were filed on Jun. 5, 2000, and under 35 U.S.C. 119(e) to U.S. Provisional Application Serial No. 60/241,174 filed on Oct. 17, 2000.

FIELD OF THE INVENTION

The present invention relates to a method for electrically coalescing emulsions especially those containing lipophilic fluid. The present invention is also directed to a method to treat fabrics wherein such an emulsion is created during the treatment process and requires electric coalescence prior to reuse of the lipophilic fluid.

BACKGROUND OF THE INVENTION

Conventional laundering techniques for the cleaning and treatment of fabric articles such as garments have long involved both traditional aqueous based washing and a technique commonly referred to as "dry cleaning". Traditional aqueous based washing techniques have involved immersion of the fabric articles in a solution of water and detergent or soap products followed by rinsing and drying. However, such conventional immersion cleaning techniques have proven unsatisfactory on a wide range fabric articles that require special handling and/or cleaning methods due to a fabric content, construction, etceteras, that is unsuitable for immersion in water.

Accordingly, the use of the laundering method of "dry cleaning" has been developed. Dry cleaning typically involves the use of non-aqueous, lipophilic fluids as the solvent or solution for cleaning. In this manner, fabrics which are incompatible with water immersion may be cleaned and treated without the potential distatrous side effects water may present.

While a broad range of non-aqueous, lipophilic fluids are available, many require the presence of low levels of water in the form of emulsions or microemulsions to maximize cleaning efficiency without sacrificing the "safety" accorded fabrics via dry cleaning. In addition, it is desirable to re-cycle and/or purify these non-aqueous, lipophilic fluids to minimize the much higher operating cost associated with dry cleaning as opposed to its aqueous based cousin. However, it is desirable to separate water from the emulsion prior to some of the lipophilic purification steps. Thus, a cost-effective, efficient, and safe way to break these emulsions is desired, particularly when adjuncts such as emulsifiers are utilized.

Separation techniques for breaking petroleum/water emulsions are known. The petroleum industry has employed electric coalescence as a separation technique for emulsions and mixtures of water and petroleum in an effort to provide safe cost effective removal of water from petroleum. Such processes have been reported and exemplified in U.S. Pat. Nos. 3,207,686; 3,342,720; 3,772,180; 3,939,395; 4,056,451; 4,126,537 and 4,308,127, the disclosures of which are all herein incorporated by reference. While these references discuss the separation of the petroleum/water emulsions, they fail to teach or disclose such separation in the presence of an emusilier whose purpose is to preserve the emulsion and prevent separation.

Traditional separation techniques for dry cleaning solvent/water emulsions and/or mixtures typically involve distillation of the emulsion and/or mixture. However, distillation often involves high operating costs in the form of energy and equipment necessary to achieve the separation and, thus is undesirable in many instances.

While the references above discuss dehydrating petroleum, they do not recognize that silicone-containing compounds and polymers, which are different materials than petroleum, may also exist in emulsions with water and may also require separation. Further, while U.S. Pat. No. 5,861,089, herein incorporated by reference, recognizes that silicone-containing compounds and polymers may require separation from water, the Patent is directed to a hydrolysis or "leeching" process wherein water is added to the silicone-containing compounds or polymers in order to remove a particular molecule or molecules. Once the water "leeches" out the sought after molecule or molecules, the water is then separated from the silicone containing compounds or polymers, leaving them free or substantially free of the undesired molecule or molecules.

The process described above, however, does not require the creation of a stable or semi-stable emulsion. It only requires contacting the water with the silicone-containing compounds and/or polymers until the "leeching" is substantially completed. In the present invention however, a stable or semi-stable emulsion may be created either purposely through the use of the emulsifiers previously described or inadvertently during the recovery step that occurs after fabric treatment. As such, U.S. Pat. No. 5,861,089 recognizes neither the necessity nor the capability to "break" these stable or semi-stable emulsions via the use of electric coalescence.

Accordingly, the need remains for a cost effective, efficient, and safe separation method for lipophilic fluids and water, particularly when an emulsifier is present.

SUMMARY OF THE INVENTION

This need is met by the present invention wherein a process for separating an emulsion having emulsification enhancing materials present therein via the use of electric coalescence is provided. Electric coalescence provides a cost effective, efficient and safe alternative to conventional separation techniques presently employed. The present invention has two embodiments.

In a first embodiment the present invention provides a process for separating an emulsion, the process comprising exposing an emulsion comprising a continuous phase, a discontinuous phase, and an emulsifier to an electric field effecting coalescence of the discontinuous phase into droplets of a size for effective gravitation from the emulsion, where the continuous phase and the discontinuous phase have different dielectric constants and densities.

In a second embodiment the present invention provides a method for treating fabrics comprising, a fabric treatment step comprising exposing said fabrics to lipophilic fluid and water, a collection step comprising collecting at least a portion of said lipophilic fluid and said water (wherein one is the continuous phase and the other is the discontinuous phase) in a stable or semi-stable emulsion; and, a processing step comprising passing said emulsion through an electric field effecting coalescence of the discontinuous phase into droplets of a size for effective gravitation from said mixture.

These and other aspects, features and advantages will become apparent to those of ordinary skill in the art from a reading of the following detailed description and the appended claims. All percentages, ratios and proportions herein are by weight, unless otherwise specified. All temperatures are in degrees Celsius (° C.) unless otherwise specified. All measurements are in SI units unless otherwise specified. All documents cited are in relevant part, incorporated herein by reference.

DETAILED DESCRIPTION OF THE INVENTION

Definitions

The term "fabrics" used herein is intended to mean any article that is customarily cleaned in a conventional laundry process or in a dry cleaning process. As such the term encompasses articles of clothing, linen, drapery, and clothing accessories. The term also encompasses other items made in whole or in part of fabric, such as tote bags, furniture covers, tarpaulins and the like.

The term "continuous phase" used herein means a component of an emulsion that comprises greater than 50% by weight of the emulsion. The continuous phase may comprise a lipophilic fluid or water.

The term "discontinuous phase" used herein means a component of an emulsion that comprises less than 50% by weight of the emulsion. The discontinuous phase may comprise a lipophilic fluid or water.

If the continuous phase and the discontinuous phase are present in the emulsion in equal amounts by weight of the emulsion, the continuous phase shall be the non-conductive or least conductive of the two phases.

The term "lipophilic fluid" used herein is intended to mean any non-aqueous fluid capable of removing sebum, as qualified by the test described below.

The terms "electric coalescence" and "electric field effecting coalescence" used herein are known processes and/or apparati and are described in U.S. Pat. No. 3,207,686 to Jarvis et al.; U.S. Pat. No. 3,342,720 to Turner; U.S. Pat. No. 3,772,180 to Prestridge; U.S. Pat. No. 3,939,395 to Prestridge; U.S. Pat. No. 4,056,451 to Hodgson; U.S. Pat. No. 4,126,537 to Prestridge; 4,308,127 to Prestridge; and U.S. Pat. No. 5,861,089 to Gatti et al., all of which are herein incorporated by reference.

Furthermore, optional adjunct ingredients such as surfactants, bleaches, and the like may be added either prior to fabric application (directly into the lipophilic fluid and/or water) or at some point during fabric application. These optional adjunct ingredients are also described in more detail below.

Lipophilic Fluid

The lipophilic fluid herein is one having a liquid phase present under operating conditions. In general such a fluid can be fully liquid at ambient temperature and pressure, can be an easily melted solid, e.g., one which becomes liquid at temperatures in the range from about 0 deg. C. to about 60 deg. C., or can comprise a mixture of liquid and vapor phases at ambient temperatures and pressures, e.g., at 25 deg. C. and 1 atm. pressure. Thus, the essential lipohilic fluid is not a compressible gas such as carbon dioxide. It is preferred that the lipophilic fluid herein be inflammable or, have relatively high flash points and/or low VOC characteristics, these terms having their conventional meanings as used in the dry cleaning industry, to equal or, preferably, exceed the characteristics of known conventional dry cleaning fluids.

Suitable lipophilic fluids herein readily flow and are non-viscous. In general, the lipophilic fluids herein are required to be fluids capable of at least partially dissolving sebum or body soil as defined in the test hereinafter. Mixtures of lipophilic fluid are also suitable, and provided that the requirements of the test are met, the lipophilic fluid can include any fraction of dry-cleaning solvents, especially newer types including non-fluorinated solvents, or perfluorinated amines. Some perfluorinated amines such as perfluorotributylamines while unsuitable for use as lipohilic fluid may be present as one of many possible adjuncts present in the lipohilic fluid. Other suitable lipohilic fluids include diol solvent systems e.g., higher diols such as C6- or C8- or higher diols; organosilicon solvents including both cyclic and acyclic types, and the like; and mixtures thereof.

A preferred group of nonaqueous liquids suitable for incorporation as the major component of the lipophilic fluid includes low-volatility non-fluorinated organics, silicones, especially those other than amino-functional silicones, and mixtures thereof. Low volatility nonfluorinated organics include for example OLEAN and other polyol esters, or certain relatively nonvolatile biodegradable mid-chain branched petroleum fractions. Suitable silicones for use as a major component, e.g., more than 50%, of the lipophilic fluid include cyclopentasiloxane, sometimes termed "D5", or linear analogs having approximately similar volatility, optionally complemented by other compatible silicones. Suitable silicones are well known in the literature, see, for example, Kirk Othmer's Encyclopedia of Chemical Technology, and are available from a number of commercial sources, including General Electric, Toshiba Silicone, Bayer, and Dow Corning. Other suitable fluids are commercially available from Procter & Gamble or from Dow Chemical and other suppliers. For example one suitable silicone is SF-1528 available from GE silicone fluids. It is worth noting that SF-1528 fluid is 90% cyclopentasiloxane (D5).

Depending on the nature of treatment the lipophilic fluid may be removed mechanically, evaporatively, or any combination thereof. For example, if the purpose of the treatment is to provide cleaning it will be desirable to mechanically remove from the fabric articles at least 50% of the textile treatment liquid, for example by spinning. On the other hand, if the purpose of the treatment is to deposit a conditioning agent into the fabric, the liquid is preferably removed evaporatively.

Qualification of Lipophilic Fluid—Lipophilic Fluid Test (LF Test)

Any non-aqueous fluid that is both capable of meeting known requirements for a dry-cleaning fluid (e.g, flash point etc.) and is capable of at least partially dissolving sebum, as indicated by the test method described below, is suitable as a lipophilic fluid herein. The ability of a particular material to remove sebum can be measured by any known technique. As a general guideline, perfluorobutylamine (Fluorinert FC-43®) on its own (with or without adjuncts) is a reference material that, by definition, is unsuitable as the lipophilic fluid herein (it is essentially a non-solvent) while D5 dissolves sebum.

The following is the method for investigating and qualifying other materials, e.g., other low-viscosity, free-flowing silicones, for use as the lipophilic fluid. The method uses commercially available Crisco® canola oil, oleic acid (95% pure, available from Sigma Aldrich Co.) and squalene (99% pure, available from J. T. Baker) as model soils for sebum. The test materials should be substantially anhydrous and free from any added adjuncts, or other materials during evaluation.

Prepare three vials. Place 1.0 g of canola oil in the first; in a second vial place 1.0 g of the oleic acid (95%), and in a third and final vial place 1.0 g of the squalene (99.9%). To each vial add 1 g of the fluid to be tested for lipophilicity.

Separately mix at room temperature and pressure each vial containing the lipophilic soil and the fluid to be tested for 20 seconds on a standard vortex mixer at maximum setting. Place vials on the bench and allow settling for 15 minutes at room temperature and pressure. If, upon standing, a single phase is formed in any of the vials containing lipophilic soils, then the fluid qualifies as suitable for use as a "lipophilic fluid" in accordance with the invention. However, if two or more separate layers are formed in all three vials, then the amount of fluid dissolved in the oil phase will need to be further determined before rejecting or accepting the fluid as qualified.

In such a case, with a syringe, carefully extract a 200 microliter sample from each layer in each vial. The syringe-extracted layer samples are placed in GC autosampler vials and subjected to conventional GC analysis after determining the retention time of calibration samples of each of the three models soils and the fluid being tested. If more than 1% of the test fluid by GC, preferably greater, is found to be present in any one of the layers which consists of the oleic acid, canola oil or squalene layer, then the test fluid is also qualified for use as a lipophilic fluid. If needed, the method can be further calibrated using heptacosafluorotributylamine, i.e., Fluorinert FC-43 (fail) and cyclopentasiloxane (pass).

A suitable GC is a Hewlett Packard Gas Chromatograph HP5890 Series II equipped with a split/splitless injector and FID. A suitable column used in determining the amount of lipophilic fluid present is a J&W Scientific capillary column DB-1HT, 30 meter, 0.25 mm id, 0.1 um film thickness cat#1221131. The GC is suitably operated under the following conditions:

Carrier Gas: Hydrogen

Column Head Pressure: 9 psi

Flows: Column Flow @~1.5 ml/min.
  Split Vent @~250–500 ml/min.
  Septum Purge @1 ml/min.

Injection: HP 7673 Autosampler, 10 ul syringe, 1 ul injection

Injector Temperature: 350° C.

Detector Temperature: 380° C.

Oven Temperature Program: initial 60° C., hold 1 min.
  rate 25° C./min.
  final 380° C. hold 30 min.

Preferred lipophilic fluids suitable for use herein can further be qualified for use on the basis of having an excellent garment care profile. Garment care profile testing is well known in the art and involves testing a fluid to be qualified using a wide range of garment or fabric article components, including fabrics, threads and elastics used in seams, etc., and a range of buttons. Preferred lipophilic fluids for use herein have an excellent garment care profile, for example they have a good shrinkage or fabric puckering profile and do not appreciably damage plastic buttons.

For purposes of garment care testing or other qualification, e.g., flammability, a lipophilic fluid for use in the lipophilic fluid can be present in a mixture, e.g., with water, at approximately the ratio to be used in the final lipophilic fluid which will come into contact with fabric articles. Certain materials, which remove sebum, qualify for use as lipophilic fluids; for example, ethyl lactates can be quite objectionable in their tendency to dissolve buttons, and if such a material is to be used in the lipophilic fluid, it will be formulated with water and/or other solvents such that the overall mix is not substantially damaging to buttons. Other lipophilic fluids, D5 for example, meets the garment care requirements commendably. Some suitable lipophilic fluids may be found in granted U.S. Pat. Nos. 5,865,852; 5,942,007; 6,042,617; 6,042,618; 6,056,789; 6,059,845; and 6,063,135, which are herein incorporated by reference.

Lipophilic solvents can include linear and cyclic polysiloxanes, hydrocarbons and chlorinated hydrocarbons. More preferred are the linear and cyclic polysiloxanes and hydrocarbons of the glycol ether, acetate ester, lactate ester families. Preferred lipophilic solvents include cyclic siloxanes having a boiling point at 760 mm Hg. of below about 250° C. Specifically preferred cyclic siloxanes for use in this invention are octamethylcyclotetrasiloxane, decamethylcyclopentasiloxane, and dodecamethylcyclohexasiloxane. Preferably, the cyclic siloxane comprises decamethylcyclopentasiloxane (D5, pentamer) and is substantially free of octamethylcyclotetrasiloxane (tetramer) and dodecamethylcyclohexasiloxane (hexamer).

However, it should be understood that useful cyclic siloxane mixtures might contain, in addition to the preferred cyclic siloxanes, minor amounts of other cyclic siloxanes including octamethylcyclotetrasiloxane and hexamethylcyclotrisiloxane or higher cyclics such as tetradecamethylcycloheptasiloxane. Generally the amount of these other cyclic siloxanes in useful cyclic siloxane mixtures will be less than about 10 percent based on the total weight of the mixture. The industry standard for cyclic siloxane mixtures is that such mixtures comprise less than about 1% by weight of the mixture of octamethylcyclotetrasiloxane.

Accordingly, the lipophilic fluid of the present invention preferably comprises more than about 50%, more preferably more than about 75%, even more preferably at least about 90%, most preferably at least about 95% by weight of the lipophilic fluid of decamethylcyclopentasiloxane. Alternatively, the lipophilic fluid may comprise siloxanes which are a mixture of cyclic siloxanes having more than about 50%, preferably more than about 75%, more preferably at least about 90%, most preferably at least about 95% up to about 100% by weight of the mixture of decamethylcyclopentasiloxane and less than about 10%, preferably less than about 5%, more preferably less than about 2%, even more preferably less than about 1%, most preferably less than about 0.5% to about 0% by weight of the mixture of octamethylcyclotetrasiloxane and/or dodecamethylcyclohexasiloxane.

Emulsifier

Emulsifiers are well known in the chemical art. Essentially, an emulsifier acts to bring two or more insoluble or semi-soluble phases together to create a stable or semi-stable emulsion. It is preferred in the claimed invention that the emulsifier serves a dual purpose wherein it is capable of acting not only as an emulsifier but also as a treatment performance booster. For example, the emulsifier may also act as a surfactant thereby boosting cleaning performance. Both ordinary emulsifiers and emulsifier/surfactants are commercially available.

Adjunct Ingredients

Adjunct materials can vary widely and can be used at widely ranging levels. For example, detersive enzymes such as proteases, amylases, cellulases, lipases and the like as well as bleach catalysts including the macrocyclic types having manganese or similar transition metals all useful in laundry and cleaning products can be used herein at very low, or less commonly, higher levels. Adjunct materials that are catalytic, for example enzymes, can be used in "forward" or "reverse" modes, a discovery independently useful from the specific appliances of the present invention. For example, a lipolase or other hydrolase may be used, optionally in the presence of alcohols as adjuncts, to convert fatty acids to esters, thereby increasing their solubility in the lipophilic fluid. This is a "reverse" operation, in contrast with the normal use of this hydrolase in water to convert a less water-soluble fatty ester to a more water-soluble material. In any event, any adjunct ingredient must be suitable for use in combination with the lipophilic fluid.

Some suitable cleaning additives include, but are not limited to, builders, surfactants, enzymes, bleach activators, bleach catalysts, bleach boosters, bleaches, alkalinity sources, antibacterial agents, colorants, perfumes, pro-perfumes, finishing aids, lime soap dispersants, composition malodor control agents, odor neutralizers, polymeric dye transfer inhibiting agents, crystal growth inhibitors, photobleaches, heavy metal ion sequestrants, anti-tarnishing agents, anti-microbial agents, anti-oxidants, anti-redeposition agents, soil release polymers, electrolytes, pH modifiers, thickeners, abrasives, divalent or trivalent ions, metal ion salts, enzyme stabilizers, corrosion inhibitors, diamines or polyamines and/or their alkoxylates, suds stabilizing polymers, solvents, process aids, fabric softening agents, optical brighteners, hydrotropes, suds or foam suppressors, suds or foam boosters, fabric softeners, anti-static agents, dye fixatives, dye abrasion inhibitors, anti-crocking agents, wrinkle reduction agents, wrinkle resistance agents, soil release polymers, soil repellency agents, sunscreen agents, anti-fade agents, and mixtures thereof.

The term "surfactant" conventionally refers to materials that are surface-active either in the water, the lipophilic fluid, or the mixture of the two. Some illustrative surfactants include nonionic, cationic and silicone surfactants as used in conventional aqueous detergent systems. Suitable nonionic surfactants include, but are not limited to:

a) Polyethylene oxide condensates of nonyl phenol and myristyl alcohol, such as in U.S. Pat. No. 4,685,930 Kasprzak; and b) fatty alcohol ethoxylates, R—$(OCH_2CH_2)_aOH$ a=1 to 100, typically 12–40, R=hydrocarbon residue 8 to 20 C atoms, typically linear alkyl. Examples polyoxyethylene lauryl ether, with 4 or 23 oxyethylene groups; polyoxyethylene cetyl ether with 2, 10 or 20 oxyethylene groups; polyoxyethylene stearyl ether, with 2, 10, 20, 21 or 100 oxyethylene groups; polyoxyethylene (2), (10) oleyl ether, with 2 or 10 oxyethylene groups. Commercially available examples include, but are not limited to: ALFONIC, BRIJ, GENAPOL, NEODOL, SURFONIC, TRYCOL. See also U.S. Pat. No. 6,013, 683 Hill et al., Suitable cationic surfactants include, but are not limited to dialkyldimethylammonium salts having the formula:

$$R'R''N^+(CH_3)_2X^-$$

Where each R'R" is independently selected from the group consisting of 12–30 C atoms or derived from tallow, coconut oil or soy, X=Cl or Br, Examples include: didodecyldimethylammonium bromide (DDAB), dihexadecyldimethyl ammonium chloride, dihexadecyldimethyl ammonium bromide, dioctadecyldimethyl ammonium chloride, dieicosyldimethyl ammonium chloride, didocosyldimethyl ammonium chloride, dicoconutdimethyl ammonium chloride, ditallowdimethyl ammonium bromide (DTAB). Commercially available examples include, but are not limited to: ADOGEN, ARQUAD, TOMAH, VARIQUAT. See also U.S. Pat. No. 6,013,683 Hill et al.,.

Suitable silicone surfactants include, but are not limited to the polyalkyleneoxide polysiloxanes having a dimethyl polysiloxane hydrophobic moiety and one or more hydrophilic polyalkylene side chains and have the general formula:

$$R^1—(CH_3)_2SiO—[(CH_3)_2SiO]_a—[(CH_3)(R^1)SiO]_b—Si(CH_3)_2—R^1$$

wherein a+b are from about 1 to about 50, preferably from about 3 to about 30, more preferably from about 10 to about 25, and each $R^1$ is the same or different and is selected from the group consisting of methyl and a poly(ethyleneoxide/propyleneoxide) copolymer group having the general formula:

$$—(CH_2)_nO(C_2H_4O)_c(C_3H_6O)_dR^2$$

with at least one $R^1$ being a poly(ethyleneoxide/propyleneoxide) copolymer group, and wherein n is 3 or 4, preferably 3; total c (for all polyalkyleneoxy side groups) has a value of from 1 to about 100, preferably from about 6 to about 100; total d is from 0 to about 14, preferably from 0 to about 3; and more preferably d is 0; total c+d has a value of from about 5 to about 150, preferably from about 9 to about 100 and each $R^2$ is the same or different and is selected from the group consisting of hydrogen, an alkyl having 1 to 4 carbon atoms, and an acetyl group, preferably hydrogen and methyl group. Examples of these surfactants may be found in U.S. Pat. No. 5,705,562 Hill and U.S. Pat. No. 5,707,613 Hill, both of which are incorporated herein by reference.

Examples of this type of surfactants are the Silwet® surfactants which are available CK Witco, OSi Division, Danbury, Conn. Representative Silwet surfactants are as follows.

| Name | Average MW | Average a + b | Average total c |
| --- | --- | --- | --- |
| L-7608 | 600 | 1 | 9 |
| L-7607 | 1,000 | 2 | 17 |
| L-77 | 600 | 1 | 9 |
| L-7605 | 6,000 | 20 | 99 |
| L-7604 | 4,000 | 21 | 53 |
| L-7600 | 4,000 | 11 | 68 |
| L-7657 | 5,000 | 20 | 76 |
| L-7602 | 3,000 | 20 | 29 |

The molecular weight of the polyalkyleneoxy group ($R^1$) is less than or equal to about 10,000. Preferably, the molecular weight of the polyalkyleneoxy group is less than or equal to about 8,000, and most preferably ranges from about 300 to about 5,000. Thus, the values of c and d can be those numbers which provide molecular weights within these ranges. However, the number of ethyleneoxy units ($—C_2H_4O$) in the polyether chain ($R^1$) must be sufficient to render the polyalkyleneoxide polysiloxane water dispersible or water soluble. If propyleneoxy groups are present in the polyalkylenoxy chain, they can be distributed randomly in the chain or exist as blocks. Preferred Silwet surfactants are L-7600, L-7602, L-7604, L-7605, L-7657, and mixtures thereof. Besides surface activity, polyalkyleneoxide polysiloxane surfactants can also provide other benefits, such as antistatic benefits, and softness to fabrics.

The preparation of polyalkyleneoxide polysiloxanes is well known in the art. Polyalkyleneoxide polysiloxanes of the present invention can be prepared according to the procedure set forth in U.S. Pat. No. 3,299,112, incorporated herein by reference.

Another suitable silicone surfactant is SF-1488, which is available from GE silicone fluids.

These and other surfactants suitable for use in combination with the lipophilic fluid as adjuncts are well known in the art, being described in more detail in Kirk Othmer's Encyclopedia of Chemical Technology, 3rd Ed., Vol. 22, pp. 360–379, "Surfactants and Detersive Systems", incorporated by reference herein. Further suitable nonionic detergent surfactants are generally disclosed in U.S. Pat. No. 3,929,678, Laughlin et al., issued Dec. 30, 1975, at column 13, line 14 through column 16, line 6, incorporated herein by reference.

The adjunct may also be an antistatic agent. Any suitable well-known antistatic agents used in laundering and dry cleaning art are suitable for use in the methods and compositions of the present invention. Especially suitable as antistatic agents are the subset of fabric softeners which are known to provide antistatic benefits. For example those fabric softeners which have a fatty acyl group which has an iodine value of above 20, such as N,N-di(tallowoyl-oxyethyl)-N,N-dimethyl ammonium methylsulfate. However, it is to be understood that the term antistatic agent is not to be limited to just this subset of fabric softeners and includes all antistatic agents.

DETAILED DESCRIPTION OF THE METHOD

Although the methods of the present invention will be described in detail, it should be understood, and one skilled in the art will recognize, that any processes and/or apparati capable of carrying out the steps of this method could be used.

Emulsion

Some lipophilic fluids that provide safe and effective treatment of fabrics require at least some water to operate effectively. Further, although water is being utilized in the treatment process, the harm to the fabrics that is to be avoided by conventional dry cleaning methods/solvents is still substantially or fully avoided. Not intending to be bound by theory, the water may also function as a carrier and/or activator for the adjunct ingredients that are not very effective in the lipophilic fluid alone. This water may be added at any point and/or in any sequence in the treatment process or may be mixed with the lipophilic fluid and/or adjunct materials prior to application to the fabrics. Regardless of how they come in contact with the fabrics however, the lipophilic fluid and water are recovered in the form of a stable or semi-stable emulsion.

Since the lipophilic fluid will be reused, it must be separated from the water and/or purified to remove body oils, dirt, and other contaminants. As such, a safe, rapid and efficient process for breaking the stable or semi-stable emulsion is needed. One embodiment of this invention requires exposing an emulsion containing a lipophilic fluid, water (wherein one is the continuous phase and the other is the discontinuous phase), and an emulsifier to an electric field to affect coalescence of the discontinuous phase into droplets of a large enough size such that the droplets gravitate from the emulsion based on the density difference of the two phases. In order to carry this method out, the two phases (lipophilic fluid and water) must have at least a minor difference in dielectric constants and densities. The emulsion may comprise 0.1% to 99.9% lipophilic fluid, 0.1% to 99.9% water, and 0.01% to 10% emulsifier.

A second embodiment is a method for treating fabrics comprising a fabric treatment step wherein fabrics are exposed to lipophilic fluid and water, a collection step wherein at least a portion of the lipophilic fluid and water is collected in the form of an emulsion having a continuous phase and a discontinuous phase, and a processing step wherein the collected emulsion is passed through an electric field to coalesce the collected discontinuous phase into droplets of a large enough size such that the droplets gravitate from the emulsion based on the density difference of the two phases.

The second embodiment may include a mixing step wherein the lipophilic fluid and water are mixed to form a stable or semi-stable emulsion prior to the fabric treatment step instead of during the collection step.

The processing step may also include a filtration step wherein the emulsion is passed through a filter for removing particulate matter from the emulsion prior to further processing. These filters are well known in the art. The processing step may also include a heating step wherein the emulsion is heated prior to the electric coalescence step in order to aid the separation process. Another way to aid the separation process may be adding demulsifying agents to the emulsion during the processing step.

Once the lipophilic fluid and water are separated, it may also be desirable to subject the lipophilic fluid used in the method to a solvent purification process. It is particularly desirable to employ a solvent purification process that permits re-use of the recovered and cleaned lipophilic fluid, either in a rinse step, or for a subsequent load of fabric articles. The purification method may be done by several methods or a combination of these methods, all well known in the art. For example, a distillation process may be employed to purify the collected lipophilic fluid. A membrane filter may also be used to purify the collected lipophilic fluid. Another method may be to employ an adsorption process to purify the lipophilic fluid. Absorption processes may also be utilized to purify the collected lipophilic fluid. An extraction process may also be utilized to purify the collected lipophilic fluid. Ion exchange and air stripping are also processes that may be employed, individually or in combination with other processes, to purify the collected lipophilic fluid.

The collection step of the present invention may be carried out in several ways. Spinning the fabric load, including the lipophilic fluid and water is well known in conventional laundry applications. Wringing or twisting or squeezing the treated fabrics is also a well-known mechanical way to extract fluids from fabrics and fabric articles. Evaporation may also be employed to collect the lipophilic fluid and water and/or to dry the fabric load. Heating the fabric load, lipophilic fluid and water or other well-known means for evaporation may do this. Spinning may be coupled with heating to assist evaporation and evaporation uniformity. If this method is employed, it will require subsequent condensation of the lipophilic fluid and water followed by the separation and purification steps.

It will be understood that the methods of the present invention may be combined with other fabric treatments. For example, prior to the application of the lipophilic fluid the fabric articles may be subjected to the particulate removal method described in co-pending application Ser. No. 60/191, 965, to Noyes et al., filed Mar. 24, 2000, the relevant parts of which are incorporated herein by reference.

The methods of the present invention may be used in a service, such as a dry cleaning service, diaper service, uniform cleaning service, or commercial business, such as a Laundromat, dry cleaner, linen service which is part of a hotel, restaurant, convention center, airport, cruise ship, port facility, casino, or may be used in the home.

The methods of the present invention may be performed in an apparatus that is a modified existing apparatus and is retrofitted in such a manner as to conduct the process of the present invention in addition to related processes.

The methods of the present invention may also be performed in an apparatus, which is not a modified existing apparatus but is one specifically built in such a manner so as to conduct the process of the present invention or may be added to another apparatus as part of a lipophilic fluid processing system. This would include all the associated plumbing, such as connection to a chemical and water supply, and sewerage for waste wash fluids.

Finally, the methods of the present invention may be performed in an apparatus, which is not a modified existing apparatus but is one specifically built in such a manner so as to conduct the process of the present invention and related processes including the treatment processes discussed hereinbefore.

An apparatus used in the processes of the present invention will typically contain some type of control system. These include electrical systems, such as, the so-called smart control systems, as well as more traditional electromechanical systems. The control systems would enable the user to select the size of the fabric load to be cleaned, the type of soiling, the extent of the soiling, the time for the cleaning cycle. Alternatively, the user could use pre-set cleaning and/or refreshing cycles, or the apparatus could control the length of the cycle, based on any number of ascertainable parameters. This would be especially true for electrical control systems. For example, when the collection rate of lipophilic fluid reaches a steady rate the apparatus could turn its self off after a fixed period of time, or initiate another process for the lipophilic fluid.

In the case of electrical control systems, one option is to make the control device a so-called "smart device". This could mean including, but not limited to, self diagnostic system, load type and cycle selection, linking the machine to the Internet and allowing for the consumer to start the apparatus remotely, be informed when the apparatus has cleaned a fabric article, or for the supplier to remotely diagnose problems if the apparatus should break down. Furthermore, if the apparatus of the present invention is only a part of a cleaning system, the so called "smart system" could be communicating with the other cleaning devices which would be used to complete the remainder of the cleaning process, such as a washing machine, and a dryer.

What is claimed is:

1. A method for treating fabrics comprising:
   a. a fabric treatment step comprising exposing a fabric to decamethylcyclopentasiloxane, water, and an emulsifier;
   b. a collection step comprising collecting at least a portion of said decamethylcyclopentasiloxane, said water, and said emulsifier in the form of an emulsion, wherein one of either said decamethylcyclopentasiloxane or said water is a continuous phase and the other is a discontinuous phase; and
   c. a processing step comprising passing said emulsion through an electric field effecting coalescence of the discontinuous phase into droplets of a size for effective gravitation from said emulsion.

2. A method according to claim 1 wherein said process also comprises a mixing step comprising mixing at least a portion of said decamethylcyclopentasiloxane, at least a portion of said water, and at least a portion of said emulsifier to form an emulsion prior to said fabric treatment step.

3. A method according to claim 1 wherein said collection step occurs after said fabric treatment step.

4. A method according to claim 1 wherein said emulsion further comprises adjunct ingredients selected from the group consisting of enzymes, bleaches, surfactants, fabric softeners, perfumes, antibacterial agents, antistatic agents, brighteners, dye fixatives, dye abrasion inhibitors, anti-cracking agents, wrinkle reduction agents, wrinkle resistance agents, soil release polymers, sunscreen agents, antifade agents, builders, sudsing agents, composition malodor control agents, composition coloring agents, pH buffers, waterproofing agents, soil repellency agents, and mixtures thereof.

5. A method according to claim 1 wherein said process also comprises a mixing step comprising mixing at least a portion of said decamethylcyclopentasiloxane and at least a portion of said water to form an emulsion prior to said fabric treatment step.

6. A method according to claim 5 wherein an emulsifier is also added to said decamethylcyclopentasiloxane and said water to form an emulsion during said mixing step.

7. A method according to claim 1 wherein said processing step further comprises a passing said emulsion through a filter for particulates.

8. A method according to claim 1 wherein said processing step further comprises heating said emulsion.

9. A method according to claim 1 wherein said processing step further comprises adding demulsifying agents to said emulsion.

10. A method according to claim 1 further comprises a purification step after said processing step, wherein said processed emulsion is subjected to the purification step.

11. A method according to claim 10, wherein said purification step is selected from the group consisting of distillation, membrane filtration, adsorption, absorption, extraction, ion exchange, air stripping, and combinations thereof.

12. A method according to claim 1 wherein said collection step comprises spinning or wringing said fabric.

13. A method according to claim 1 wherein said collection step comprises evaporating at least a portion of said decamethylcyclopentasiloxane and at least a portion of said water and condensing at least a portion of said decamethylcyclopentasiloxane and at least a portion of said water.

* * * * *